United States Patent
Semba

(10) Patent No.: US 7,486,469 B1
(45) Date of Patent: Feb. 3, 2009

(54) MINIMIZING A MECHANICAL MODE EXCITATION UTILIZING A GENERATED SEEK TRAJECTORY

(75) Inventor: Tetsuo Semba, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/981,929

(22) Filed: Oct. 31, 2007

(51) Int. Cl.
G11B 21/02 (2006.01)
(52) U.S. Cl. ...................................................... 360/75
(58) Field of Classification Search .................. 360/75, 360/25, 77.03, 78.09, 78.05; 341/118; 702/60; 706/22; 244/17.13
See application file for complete search history.

(56) References Cited

U.S. PATENT DOCUMENTS

| | | | |
|---|---|---|---|
| 4,937,689 A | 6/1990 | Seaver et al. | |
| 5,050,146 A | 9/1991 | Richgels et al. | |
| 5,345,409 A * | 9/1994 | McGrath et al. | 702/60 |
| 5,510,939 A * | 4/1996 | Lewis | 360/78.09 |
| 5,583,501 A * | 12/1996 | Henrion et al. | 341/118 |
| 6,219,196 B1 | 4/2001 | Semba et al. | |
| 6,384,994 B1 * | 5/2002 | Smith et al. | 360/25 |
| 6,449,117 B1 | 9/2002 | Waugh | |
| 6,831,809 B2 | 12/2004 | Kagami et al. | |
| 6,870,342 B2 | 3/2005 | Naik | |
| 6,888,694 B2 * | 5/2005 | Guo et al. | 360/77.03 |
| 7,017,857 B2 * | 3/2006 | Hill et al. | 244/17.13 |
| 7,126,785 B1 * | 10/2006 | Li et al. | 360/78.05 |
| 2002/0131186 A1 * | 9/2002 | Ottesen et al. | 360/25 |
| 2003/0147172 A1 | 8/2003 | Singer et al. | |
| 2004/0001278 A1 | 1/2004 | Andress et al. | |
| 2004/0030664 A1 * | 2/2004 | Kotoulas et al. | 706/22 |
| 2006/0077588 A1 | 4/2006 | Shih | |
| 2006/0082922 A1 | 4/2006 | Shih | |
| 2006/0114601 A1 | 6/2006 | Semba et al. | |
| 2006/0158773 A1 | 7/2006 | Semba et al. | |

FOREIGN PATENT DOCUMENTS

| | | |
|---|---|---|
| EP | 0263962 | 1/1992 |
| JP | 03233609 | 10/1991 |

OTHER PUBLICATIONS

Mizoshita, et al., "Vibration Minimized Access Control For disk Drives", *IEEE Transactions on Magnetics*, vol. 32, No. 3, May 1996, 1793-1798.

Semba, et al., "Optimal Seek Trajectory Generation for a Hard Disk Drive Using Adaptive Filtering", *Proceedings of the 2006 American Control Conference*, (Jun. 2006),594-599.

* cited by examiner

Primary Examiner—Fred Tzeng

(57) ABSTRACT

A method of minimizing a mechanical mode excitation is disclosed. A seed position trajectory is generated utilizing a third order time polynomial, wherein the third order time polynomial is segmented for constant velocity, and deceleration. A reference position is generated by applying a first infinite impulse response filter to the seed position trajectory. A reference acceleration is then generated by applying a second infinite impulse response filter to the reference position. Then, the reference position and the reference acceleration are fed forward to a servo loop such that an actuator follows a desired seek trajectory, thereby reducing a position error signal at the seek settling.

20 Claims, 5 Drawing Sheets

MINIMIZING A MECHANICAL MODE EXCITATION UTILIZING A GENERATED SEEK TRAJECTORY

TECHNICAL FIELD

The present invention relates to the field of hard disk drive development, and more particularly to resolving mechanical mode excitations during hard disk drive operations.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

In operation, the hard disk is rotated at a set speed via a spindle motor assembly having a central drive hub. Additionally, there are tracks spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

An important function in an HDD is seek control. Seek control means moving a head from one track to another. It is desirable to move this head very quickly in order that reading and writing may be performed more quickly. However, the actuator vibrates if the head moves too fast, causing settling difficulty due to these vibrations. Additionally, even though fewer vibrations occur when the head moves slowly, the seek trajectory also becomes slower resulting in performance degradation. For example, a slower seek trajectory results in slower read/writes. Consequently, there is a need for a system and method which provides for a smoother actuator movement while experiencing a rapid trajectory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of minimizing a mechanical mode excitation is disclosed. A seed position trajectory is generated utilizing a third order time polynomial, wherein the third order time polynomial is segmented for acceleration, constant velocity, and deceleration. A reference position is generated by applying a first infinite impulse response filter to the seed position trajectory. A reference acceleration is then generated by applying a second infinite impulse response filter to the reference position. Then, the reference position and the reference acceleration are fed forward to a servo loop such that an actuator follows a desired seek trajectory, thereby reducing a position error signal at the seek settling.

Figure 1:
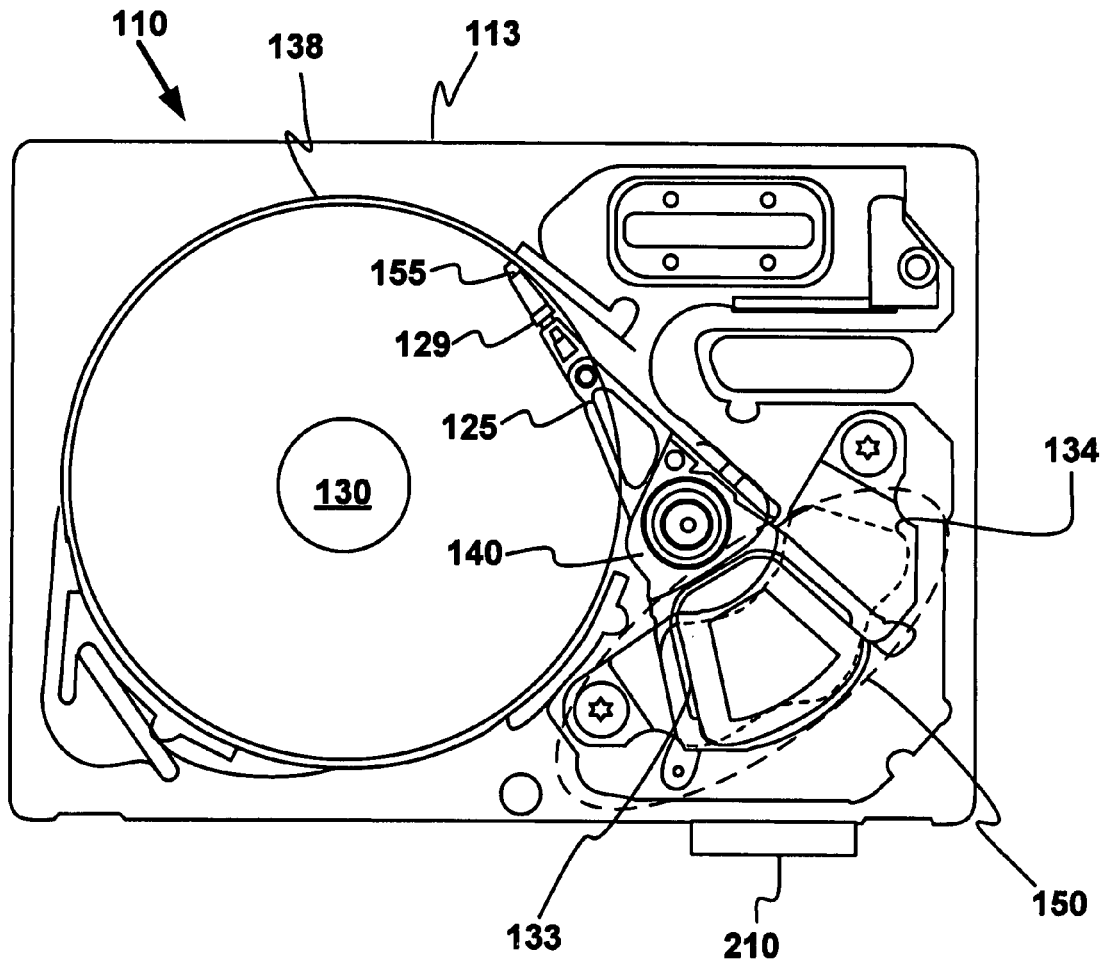
FIG. 1 is a plan view of an HDD with cover and top magnet removed in accordance with one embodiment of the present technology.

The drawings referred to in this description should be understood as not being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

OVERVIEW

As described herein, one problem with quickly moving a head from one track to another is the resulting vibrations due to the mechanics within the HDD. These vibrations make seek settling difficult. When an HDD experiences vibrations due to seek operations, its read/write head is not able to accurately follow on the same track, thereby producing errors during the read/write process. Additionally, if the seek trajectory is slowed such that disk reading and writing are also slowed, there is degradation in the seek time and hence the HDD's performance.

However, by utilizing the excitation minimizer described herein, the mechanical mode excitation is avoided, thereby minimizing vibrations and increasing performance speed and quality. An excitation minimizer reduces a position error signal by applying an infinite impulse response filter to a seed position trajectory in order to generate a reference position. The infinite impulse response filter is designed such that frequencies which excite the mechanical mode do not pass through the filter. Then another filter is applied to a reference position in order to generate a reference acceleration. The reference position and reference acceleration are fed forward to a servo loop such that an actuator follows a desired seek trajectory. The error between the reference position and the head position is minimized by a feedback controller. Consequently, since a head is following a desired seek trajectory, a position error signal at the seek settling is reduced, increasing the performance capabilities of the HDD.

The following discussion will begin with an overview of a hard disk drive and components connected therewith. The discussion will then focus on embodiments of a system and method of reducing or eliminating the effect of vibrations associated with hard disk drive operations.

OPERATION OF EXAMPLE HARD DISK DRIVE

With reference now to FIG. 1, a schematic drawing of one embodiment of an information storage system including a magnetic hard disk file or HDD 110 for a computer system is shown. Although, only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 125. When a number of actuator arms 125 are present, they are usually represented in the form of a comb that is movably or pivotally mounted to base/housing 113. A voice coil motor (VCM) assembly 150 is also mounted to base 113 for moving the actuator arms 125 relative to the disk 138. Actuator assembly 140 may be coupled with a connector assembly 210, which is utilized to convey data between arm electronics and a host system, such as a computer, wherein HDD 110 resides.

In one embodiment, each arm 125 has extending from it at least one cantilevered suspension 129. The slider 155 is usually bonded to the end of the suspension 129. The level of integration containing the slider 155, suspension 129, and read/write head is called the head gimbal assembly (HGA).

The suspension 129 has a spring-like quality, which biases or presses the air-bearing surface of slider 155 against disk 138 to cause slider 155 to fly at a precise distance from disk 138. The suspension 129 has a hinge area that provides for the spring-like quality, and a flexing interconnect that supports read and write traces and electrical connections through the hinge area. A voice coil 133, free to move within a conventional voice coil motor magnet assembly 134 is also mounted to actuator arms 125 opposite the head gimbal assemblies. Movement of the actuator assembly 140 by voice coil motor assembly 150 causes the head gimbal assembly to move along radial arcs across tracks on the surface of disk 138.

Architecture

Figure 2A:
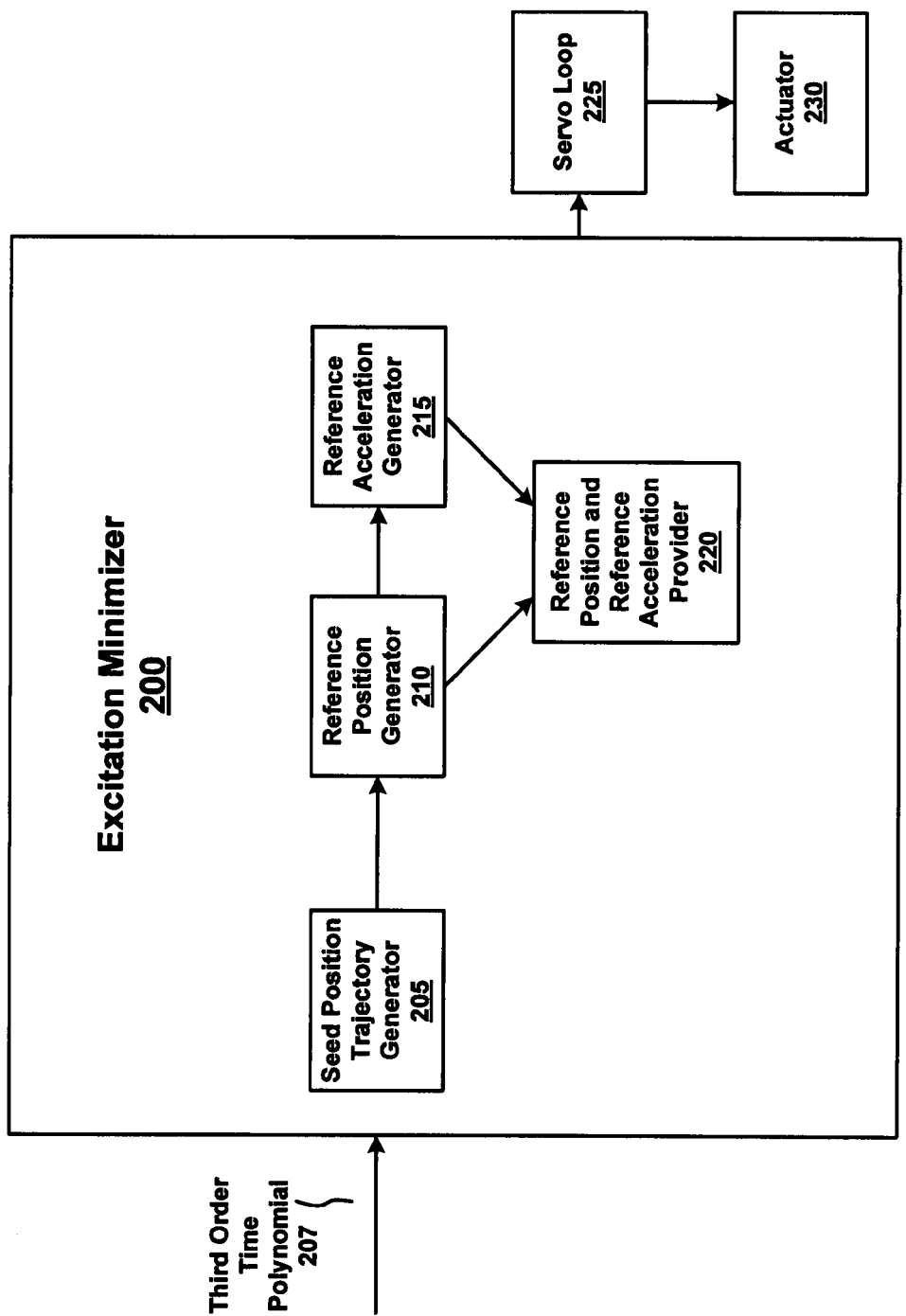
FIG. 2A is a block diagram of an example excitation minimizer for minimizing a mechanical mode excitation in accordance with one embodiment of the present technology.

With reference now to 200 of FIG. 2A, a block diagram of an example excitation minimizer 200 in accordance with one embodiment of the present technology is shown. Excitation minimizer 200 is configured for minimizing a mechanical mode excitation by using a third order time polynomial 207 to generate a reference position and reference acceleration which are both fed forward to a servo loop 225 such that an actuator 230 (a component of actuator assembly 140) follows a desired seek trajectory, thereby reducing a position error signal. Initially, a seed position trajectory is calculated. This seed position trajectory is the trajectory which moves actuator 230 as fast as possible. However, since actuator 230 is moving quickly, excitation of the mechanics within HDD 110 occurs, such as vibrations. Applying IIR filters to the seed position trajectory enables the minimization of these mechanical excitations. More specifically, two separate IIR filters aid in producing a position and an acceleration signal. These two signals function to match the characteristics of actuator 230, such as a force being inputted into actuator 230 and a position being realized by actuator 230. Hence, the vibrations of actuator 230 at seek settling are minimized or eliminated by a smooth force and position signal being applied via servo loop 225 to actuator 230.

In one embodiment, excitation minimizer 200 comprises seed position trajectory generator 205, reference position generator 210, reference acceleration generator 215, and reference position and reference acceleration provider 220. Seed position trajectory generator 205 is configured to generate a seed position trajectory utilizing third order time polynomial 207, wherein third order time polynomial 207 is segmented for acceleration, constant velocity, and deceleration.

Figure 2B:
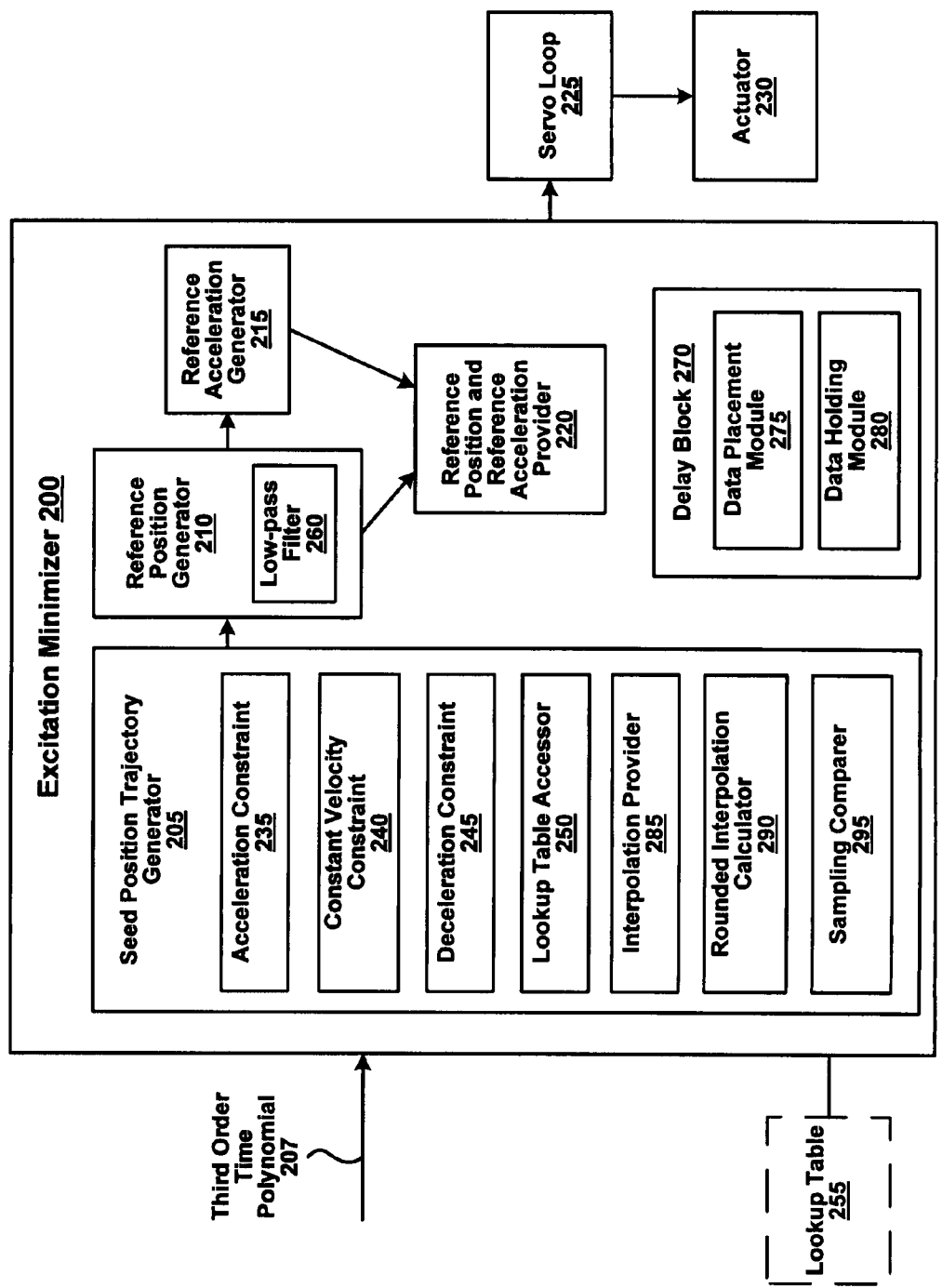
FIG. 2B is a block diagram of an example excitation minimizer for minimizing a mechanical mode excitation in accordance with one embodiment of the present technology.

Referring now to FIG. 2B, a block diagram of an example excitation minimizer 200 in accordance with one embodiment of the present technology is shown. In one embodiment, seed position trajectory 205 comprises an acceleration constraint 235, a constant velocity constraint 240, and a deceleration constraint 245. Acceleration constraint 235, constant velocity constraint 240, and deceleration constraint 245 are configured to provide a constraint such that acceleration is zero at a beginning and an end of a seek, velocity is zero at said beginning and said end of said seek, and a target position is reached at said end of said seek. These constraints operate as limits or boundaries to seed position trajectory generator 205. For example, the initial defined trajectory must not exceed these limits while performing a seek.

Referring still to FIG. 2B, as well as to FIGS. 1 and 2A, in another embodiment of the present technology, seed position trajectory generator 205 comprises a lookup table accessor 250, an interpolation provider 285, a rounded interpolation calculator 290, and a sampling comparer 295. Furthermore, seed position trajectory generator 205 may also comprise lookup table 255.

Lookup table accessor 250 is configured to respond to a seek instruction by accessing lookup table 255 to read at least one set of durations of acceleration, constant velocity, and deceleration, wherein lookup table 255 is designed such that a maximum acceleration, velocity, and deceleration does not exceed a specified limit at every seek length. Lookup table 255 lists a corresponding duration of acceleration, constant velocity, and deceleration that satisfy acceleration constraint 235, constant velocity constraint 240, and deceleration constraint 245 for certain seek lengths, but not all possible seek lengths. Thus, the durations of acceleration, constant velocity, and deceleration may be obtained, but the duration of the constant velocity can be zero if the seek length is short. These durations are used to determine which segment of seed position trajectory 305 is chosen during a seek operation.

For example, suppose the duration of acceleration, constant velocity, and deceleration are 100, 10, and 200, respectively. The acceleration trajectory used for the sampling time is less than 100, the constant velocity trajectory used for the sampling time is less than 110, and the deceleration trajectory used for the sampling time is less than 310. The sampling time in this instance refers to a time counter starting from a seek initiation. Lookup table 255 is communicatively coupled with excitation minimizer 200.

Interpolation provider 285 is configured to provide an interpolation of at least one set of durations for a specified seek length which is not listed on lookup table 255. Rounded interpolation calculator 290 is configured to calculate a duration of acceleration, constant velocity, and deceleration by rounding said duration to an integer multiple of a sampling time and utilizing this rounded duration to generate a re-calculated acceleration and deceleration magnitude. Sampling comparer 295 is configured to compare the sampling time in a seek operation with the re-calculated durations of acceleration, constant velocity, and deceleration to determine which segment of the seed position trajectory is to be used.

In one embodiment, reference position generator 210 is configured to generate a reference position by applying a first infinite impulse response filter to a seed position trajectory. A reference position determines the actuator 230 position to follow during a seek operation. In one embodiment, reference position generator 210 comprises a low-pass filter 260 configured to minimize a high frequency mode excitation as the first infinite impulse response filter 315, wherein low-pass filter 260 has a null frequency to minimize mechanical mode excitation.

In another embodiment of the present technology, reference acceleration generator 215 is configured to generate a reference acceleration by applying a second infinite impulse response filter to the reference position. A reference acceleration determines the acceleration needed to move actuator 230 to its intended track position, taking into account the input associated with a reference position.

Referring still to FIG. 2B and to FIGS. 1 and 2A, in one example, excitation minimizer 200 comprises delay block 270 configured for realizing a delay in feeding the reference position to the feedforward servo loop in order to compensate for a delay in an electrical circuit to drive actuator 230. Delay block 270 is used to hold the system from forwarding a reference position to actuator 230. In one example, delay block 270 comprises data placement module 275. Data placement module 275 is configured to place data associated with the reference position in the memory described herein. In another embodiment, delay block 270 comprises data holding module 280. Data holding module 280 is configured to hold data associated with the reference position in the memory. The time for which data is held is equal to the delay of the electrical circuit to drive actuator 230. In yet another example, delay block 270 comprises both data placement module 275 and data holding module 280.

Thus, the embodiments described herein of excitation minimizer 200 enable mechanical mode excitations to be minimized, while still providing for the fastest seek trajectory to be realized. The following Operation section will discuss an implementation of excitation minimizer 200 discussed above.

Operation

Figure 3:
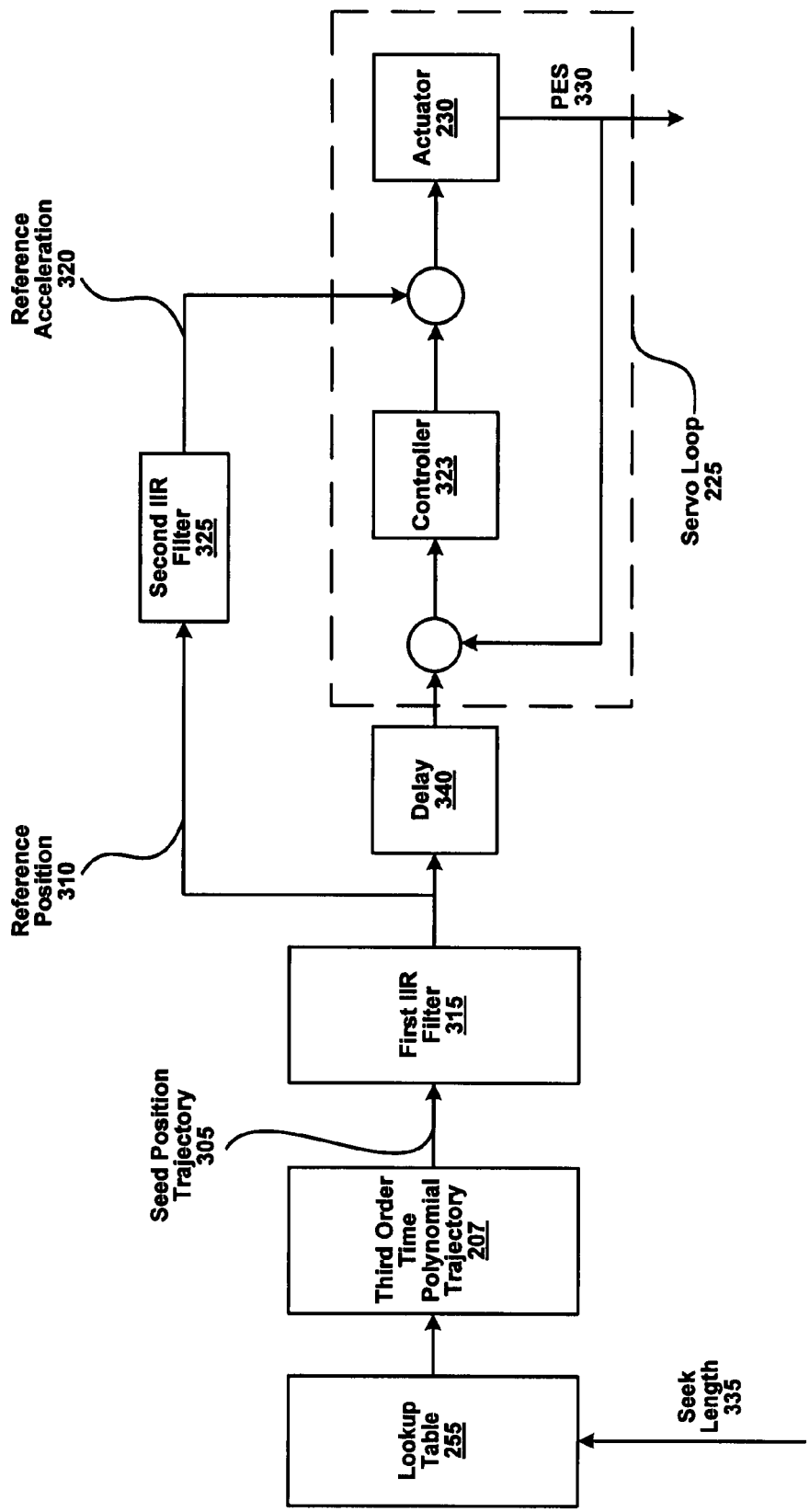
FIG. 3 is a block diagram showing the process performed to minimize a mechanical mode excitation in accordance with one embodiment of the present technology.
Figure 4:
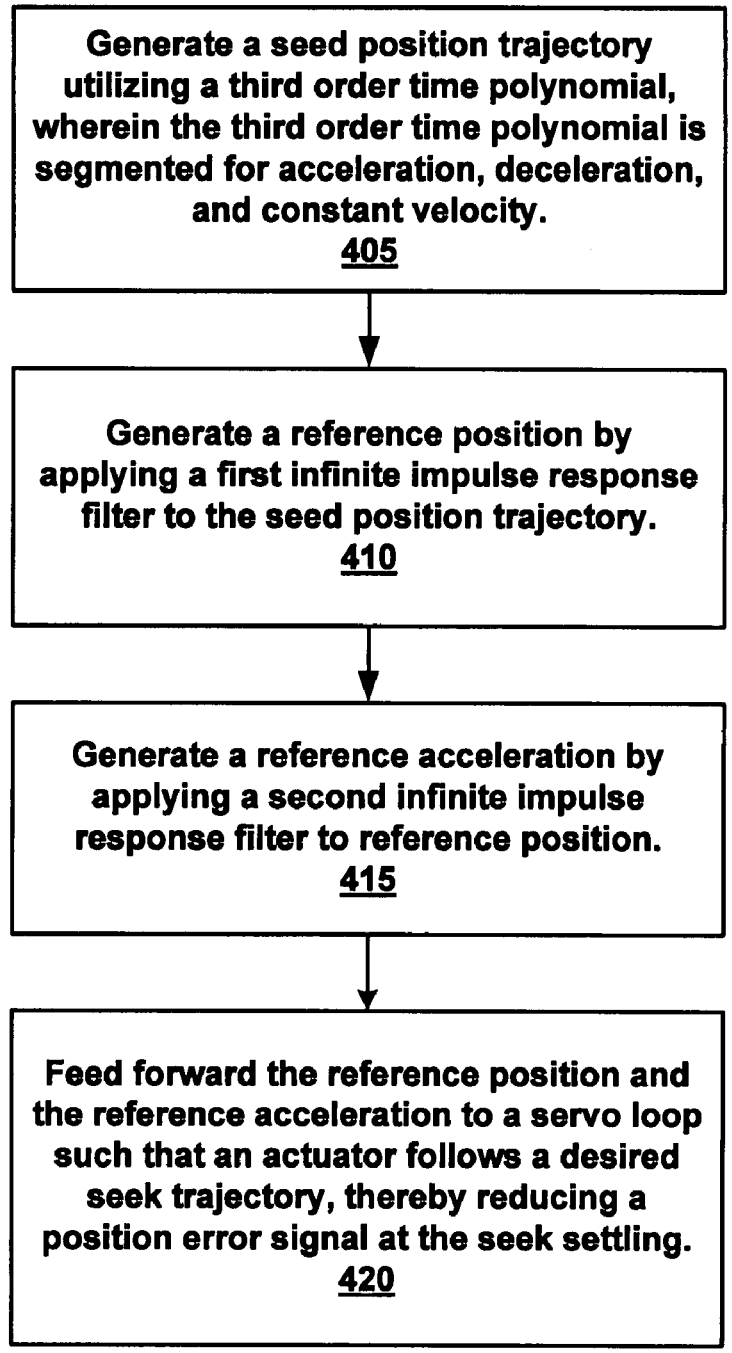
FIG. 4 is a flowchart of an example method of minimizing a mechanical mode excitation in accordance with one embodiment of the present technology.

Referring now to FIG. 3, a block diagram showing the process performed to minimize a mechanical mode excitation, and to FIG. 4, a flowchart of an example method of minimizing a mechanical mode excitation, and to FIGS. 2A and 2B, one embodiment generates a seed position trajectory 305 utilizing a third order time polynomial 210, wherein the third order time polynomial 210 is segmented for acceleration, constant velocity, and deceleration. Then reference position 310 is generated by applying first infinite impulse response filter 315 to seed position trajectory 305. Reference acceleration 320 is then generated by applying second infinite impulse response filter 325 to reference position 310. Next, reference position 310 and reference acceleration 320 are fed forward to servo loop 225 such that actuator 230 follows a desired seek trajectory, thereby reducing position error signal 330 at the seek settling.

Referring now to 410 of FIG. 4, and FIGS. 2A, 2B, as well as FIG. 3, in one example of the present technology, in generating seed position trajectory 305, constraints for the acceleration, constant velocity, and deceleration are provided, wherein the acceleration is zero at a beginning and an end of a seek, velocity is zero at the beginning and the end of the seek, and a target position is reached at the end of the seek. These constraints are considered in lookup table 255.

In another embodiment of the present technology, generating seed position trajectory 305 comprises, in response to an initiation of a seek, accessing lookup table 255 to find a closest seek length and to read durations of acceleration, constant velocity, and deceleration, wherein lookup table 255 is designed such that a maximum acceleration, velocity, and deceleration do not exceed a specified limit at every seek length 335. Next, an interpolation of durations of acceleration, constant velocity, and deceleration for a specified seek length 335 is provided. These interpolated durations are then rounded to an integer multiple of a sampling time and utilized to generate a re-calculated acceleration and deceleration magnitude. The sampling time in a seek operation is then compared with the durations of acceleration, constant velocity, and deceleration to determine which segment of seed position trajectory 305 is to be used.

In other words, given seek length 335, lookup table 255 is used to identify the duration of acceleration, constant velocity, and deceleration, so that at least one of these durations may be used to calculate a rounded interpolation. The rounded interpolation is used to durations of acceleration, constant velocity, and deceleration required to reach a desired position. The sampling time of a seek operation is then compared to durations of acceleration, constant velocity, and deceleration in order to generate seed position trajectory 305.

Referring now to 410 of FIG. 4, and to FIGS. 2A, 2B, and 3, one embodiment generates a reference position 310 by applying a first infinite impulse response filter 315 to seed position trajectory 305. As described herein, when a seek is performed at a certain seek trajectory, a mechanical mode is excited, thereby causing vibrations within HDD. As described herein, once a seek has been initiated, the present technology provides that a seed position trajectory 305 is determined. First infinite impulse response filter 315 is then applied to seed position trajectory 305. By utilizing a low-pass filter 260 as first infinite impulse response filter 315, seed position trajectory 305 is modified to smooth reference position 310 which actuator 230 follows during a seek operation. Thus, mechanical modes of actuator 230 are not excited and vibration at the seek settling is reduced.

In one example, a high frequency mode excitation is minimized utilizing a low-pass filter as first infinite impulse response filter 315. The low-pass filter has a null frequency to minimize mechanical mode excitation.

Referring now to 415 of FIG. 4, and to FIGS. 2A, 2B, and 3, one embodiment generates a reference acceleration by applying second infinite impulse response filter 325 to reference position 310. In one example of the present technology, while second infinite impulse response filter 325 is being applied to reference position 310, a delay is realized in feeding reference position 310 to feedforward servo loop 225 in order to compensate for a delay in an electrical circuit to drive the actuator 230. In one embodiment, data associated with reference position 310 is placed and/or held in memory during this delay.

Referring now to 420 of FIG. 4, and to FIGS. 2A, 2B, and 3, one embodiment feeds forward reference position 310 and reference acceleration 320 to servo loop 225 such that actuator 230 follows a desired seek trajectory, thereby reducing position error signal 330 at the seek settling. The position signal and the acceleration signal function to match the characteristics of actuator 230, such as the force being inputted into actuator 230 and a position being realized by actuator 230.

Thus, embodiments of the present invention provide an apparatus and method of minimizing a mechanical mode excitation utilizing a generated seek trajectory. By a smooth force and position signal being applied via servo loop 225 to actuator 230, errors occurring due to mechanical excitation within HDD 110 are reduced, thereby minimizing or eliminating vibrations of actuator 230 at seek settling.

What is claimed is:

1. A method of minimizing a mechanical mode excitation, said method comprising:
   generating a seed position trajectory utilizing a third order time polynomial, wherein said third order time polynomial is segmented for acceleration, constant velocity, and deceleration;
   generating a reference position by applying a first infinite impulse response filter to said seed position trajectory;
   generating a reference acceleration by applying a second infinite impulse response filter to said reference position; and
   feeding forward said reference position and said reference acceleration to a servo loop such that an actuator follows a desired seek trajectory, thereby reducing a position error signal at a seek settling.

2. The method of claim 1, wherein said utilizing a third order time polynomial further comprises:
   providing a constraint for said acceleration, constant velocity, and deceleration, wherein said acceleration is zero at a beginning and an end of a seek, said velocity is zero at said beginning and said end of said seek, and a target position is reached at said end of said seek.

3. The method of claim 1, wherein said generating a seed position trajectory further comprises:
   in response to an initiation of a seek, accessing a lookup table to read at least one set of durations of acceleration, constant velocity, and deceleration, wherein said lookup table is designed such that a maximum acceleration, velocity, and deceleration do not exceed a specified limit at every seek length;
   providing an interpolation of said at least one set of durations for a specified seek length;
   calculating a rounded duration by rounding said interpolation to an integer multiple of a sampling time and utilizing said rounded duration to generate a re-calculated acceleration and deceleration magnitude; and
   comparing said sampling time with said set of durations of acceleration, constant velocity, and deceleration to determine which segment of said seed position trajectory is to be used.

4. The method of claim 1, wherein said generating a reference position by applying a first infinite impulse response filter to said seed trajectory position further comprises:
   minimizing a high frequency mode excitation utilizing a low-pass filter as said first infinite impulse response filter, said low-pass filter having a null frequency to minimize mechanical mode excitation.

5. The method of claim 1, further comprising:
   realizing a delay in said feeding said reference position to said feedforward servo loop in order to compensate for a delay in an electrical circuit to drive an actuator.

6. The method of claim 5, wherein said realizing a delay further comprises:
   placing data associated with said reference position in memory.

7. The method of claim 5, wherein said realizing a delay further comprises:
   holding data associated with said reference position in memory.

8. An excitation minimizer for minimizing a mechanical mode excitation, said excitation minimizer comprising:
   a seed position trajectory generator configured to generate a seed position trajectory utilizing a third order time polynomial, wherein said third order time polynomial is segmented for acceleration, constant velocity, and deceleration;
   a reference position generator configured to generate a reference position by applying a first infinite impulse response filter to said seed position trajectory;
   a reference acceleration generator configured to generate a reference acceleration by applying a second infinite impulse response filter to said reference position; and
   a reference position and acceleration provider configured to feed forward said reference position and said reference acceleration to a servo loop such that an actuator follows a desired seek trajectory, thereby reducing a position error signal at a seek settling.

9. The excitation minimizer of claim 8, wherein said seed position trajectory generator comprises:
   an acceleration constraint, constant velocity constraint, and deceleration constraint configured to provide a constraint such that acceleration is zero at a beginning and an end of a seek, a velocity is zero at said beginning and said end of said seek, and a target position is reached at said end of said seek.

10. The excitation minimizer of claim 8, wherein said seed position trajectory generator further comprises:
    a lookup table accessor configured to respond to a seek instruction by accessing a lookup table to read at least one set of durations of acceleration, constant velocity, and deceleration, wherein said lookup table is designed such that a maximum velocity, and deceleration, do not exceed a specified limit at every seek length;
    an interpolation provider configured to provide an interpolation of said at least one set of durations for a specified seek length;
    a rounded interpolation calculator configured to calculate a rounded duration by rounding said interpolation to an integer multiple of a sampling time and utilizing said rounded interpolation to generate a re-calculated acceleration and deceleration magnitude; and
    a sampling time comparer configured to compare said sampling time with said rounded duration of acceleration, constant velocity, and deceleration to determine which segment of said seed position trajectory is to be used.

11. The excitation minimizer of claim 8, wherein said reference position generator further comprises:
    a low-pass filter configured to minimize a high frequency mode excitation as said first infinite impulse response filter, said low-pass filter having a null frequency to minimize mechanical mode excitation.

12. The excitation minimizer of claim 8, further comprising:
    a delay block configured for realizing a delay in said feeding said reference position to said feedforward servo loop in order to compensate for a delay in an electrical circuit to drive an actuator.

13. The excitation minimizer of claim 8, wherein said delay block comprises:
    a data placement module configured for placing data associated with said reference position in memory.

14. The excitation minimizer of claim 8, wherein said delay block comprises:

a data holding module configured for holding data associated with said reference position in memory.

15. The instructions on a computer usable medium wherein the instructions when executed cause a computer system to perform a method of minimizing a mechanical mode excitation, said method comprising:

generating a seed position trajectory utilizing a third order time polynomial, wherein said third order time polynomial is divided into segments of constant velocity, and deceleration, and contains constraints associated with said acceleration, said constant velocity, and said deceleration;

generating a reference position by applying a first infinite impulse response filter to said seed position trajectory;

generating a reference acceleration by applying a second infinite impulse response filter to said reference position; and feeding forward said reference position and said reference acceleration to a servo loop such that an actuator follows a desired seek trajectory, thereby reducing a position error signal at settling.

16. The method of claim 15, wherein said generating a seed position trajectory further comprises:

in response to an initiation of a seek, accessing a lookup table to read at least one set of durations of said acceleration, said constant velocity, and said deceleration, wherein said lookup table is designed such that a maximum said acceleration, a maximum said deceleration, and a maximum said constant velocity do not exceed a specified limit at every seek length;

providing an interpolation of said at least one set of durations for a specified seek length;

calculating a rounded duration by rounding said interpolation to an integer multiple of a sampling time and utilizing said rounded duration to generate a re-calculated acceleration and deceleration magnitude; and comparing said sampling time with said rounded durations of acceleration, constant velocity, and deceleration to determine which segment of said seed position trajectory is to be used.

17. The method of claim 15, wherein said generating a reference position by applying a first infinite impulse response filter to said seed trajectory position further comprises:

minimizing a high frequency mode excitation utilizing a low-pass filter as said first infinite impulse response filter, said low-pass filter having a null frequency to also minimize mechanical mode excitation.

18. The method of claim 15, further comprising:

realizing a delay in said feeding said reference position to said feedforward servo loop in order to compensate for a delay in an electrical circuit to drive an actuator.

19. The method of claim 18, wherein said realizing a delay further comprises:

placing data associated with said reference position in memory.

20. The method of claim 18, wherein said realizing a delay further comprises:

holding data associated with said reference position in memory.

* * * * *